United States Patent [19]

DeReamer et al.

[11] Patent Number: 4,495,065
[45] Date of Patent: Jan. 22, 1985

[54] VIBRATORY SCREENING APPARATUS AND METHOD

[75] Inventors: Sharon M. B. DeReamer, Spring; Dennis R. Eifling, Katy, both of Tex.

[73] Assignee: Dresser Industries, Inc., Dallas, Tex.

[21] Appl. No.: 472,820

[22] Filed: Mar. 7, 1983

[51] Int. Cl.³ .................... B01D 33/38; B07B 1/00
[52] U.S. Cl. ...................... 209/243; 209/254; 209/269; 210/456
[58] Field of Search ............ 209/254, 269, 265, 243, 209/267, 261, 273, 314, 134, 135, 236, 266, 263, 250; 210/388, 383, 384, 519, 456

[56] References Cited

U.S. PATENT DOCUMENTS 1,685,621 9/1928 Allen ............................ 209/269
3,666,095 5/1972 Krynock et al. ................ 209/254
4,306,974 12/1981 Harry ........................... 210/388

FOREIGN PATENT DOCUMENTS 638874 11/1936 Fed. Rep. of Germany ...... 209/243

Primary Examiner—Frank W. Lutter
Assistant Examiner—Wm. Bond
Attorney, Agent, or Firm—Barry E. Deutsch

[57] ABSTRACT

A vibratory screening machine for separating particles from fluid includes a fine mesh screen located within a vibratory basket. The machine further includes a supply for delivering fluid having the entrained particles from a source thereof towards the screen. A weir is disposed substantially adjacent the supply and overlies an upstream portion of the screen for directing the flow of fluid onto the screen. The weir includes an upstream end positioned adjacent the supply and a downstream end. A plate forming a dam is attached to the downstream end of the weir to form a pool of fluid on the weir. The weir includes at least one fluid flow opening positioned substantially adjacent the plate forming the dam. A flow directing plate is connected to the weir for directing the fluid flowing through the fluid flow opening towards the upstream portion of the screen underlying the weir.

9 Claims, 4 Drawing Figures

VIBRATORY SCREENING APPARATUS AND METHOD

BACKGROUND OF THE INVENTION

This invention concerns vibratory screening apparatus particularly for the screening of fluids such as mud obtained from well drilling operations and the like, and in particular to such apparatus having increased volumetric capacity and improved screen life. The invention further relates to a method of separating particles from a fluid in which the particles are entrained.

It is well known in the rotary drilling of wells that it is extremely important to remove drilled solids, i.e. cuttings, cavings, sand, and shale from the mud used during the drilling operation. Recirculation of the drilled solids can create viscosity and gel problems in the mud, as well as increased wear in the mud pump and mechanical equipment employed during the drilling operation. Solids control thus becomes one of the most important phases of mud control.

A shale shaker or vibrating screen has proven extremely successful in removing drilled solids from the mud. Generally, a fine screen cloth of 20 to 150 mesh is employed with the vibrating screen. The screen generally comprises at least two overlying layers of screen cloth.

The frame of the vibrating screen is resiliently suspended or mounted upon a support and is caused to vibrate by means of a vibrating mechanism, for instance a revolving unbalanced weight carried by a rapidly rotating shaft disposed transversely of the frame. Vibration of the frame caused by the vibrating mechanism results in the fine mesh screen cloth moving in an axially or longitudinal or rotational direction with respect to the frame support. Vibration of the screen serves several purposes: (1) it prevents the solids from accumulating on the screen and blocking the mesh; (2) it conveys the solids to the front of the screen where they can be collected and typically fall off to facilitate disposal; and (3) it increases the volumetric capacity of the screen.

As one would anticipate, the operating life of the fine mesh screen is extremely important. Generally, the fluid having the entrained particles or solids is delivered onto a weir or similar mechanism used for directing the flow of fluid from the source thereof onto the screen. The weir is intended to distribute the mud over a relatively large area of the screen. However, in actual practice, it has been found that the weir is generally ineffective and that a substantial portion of the mud falls on a rather limited or confined area of the screen. Further, it has been observed that a substantial portion of the mud falls from the weir downstream of the feed end or upstream portion of the screen underlying the weir. Essentially, this upstream portion of the screen is underutilized thereby reducing the overall capacity of the screen.

SUMMARY OF THE INVENTION

Accordingly, it is an object of this invention to increase the operating life of a fine mesh screen used in a vibratory screening machine employed to remove solids or particulate matter from a fluid.

It is a further object of this invention to increase the capacity per square foot of screen in the vibratory screening machine.

It is yet another object of this invention to increase the retention time of fluid falling onto the upstream portion of the screen in a vibratory screening machine.

It is still another object of this invention to more fully utilize the total surface area of the screen used in a vibratory screening machine.

These and other objects of the present invention are attained in a vibratory screening machine for separating particles from fluid in which a fine mesh screen is located within a vibratory basket and means is provided for vibrating the basket. The machine further includes supply means for delivering fluid having the entrained particles from a source thereof towards the vibrating screen. Weir means is disposed substantially adjacent the supply means and overlying an upstream portion of the screen for directing the flow of fluid onto the screen. The weir means includes an upstream end positioned adjacent the supply means and a downstream end. Dam means is attached to the downstream end of the weir means for forming a pool of fluid on the weir means. The weir means includes at least one fluid flow opening positioned substantially adjacent the dam means. Flow directing means is connected to the weir means for directing the fluid flowing through the one fluid flow opening towards the upstream portion of the screen underlying the weir means.

DESCRIPTION OF THE PREFERRED EMBODIMENTS

Figure 1:
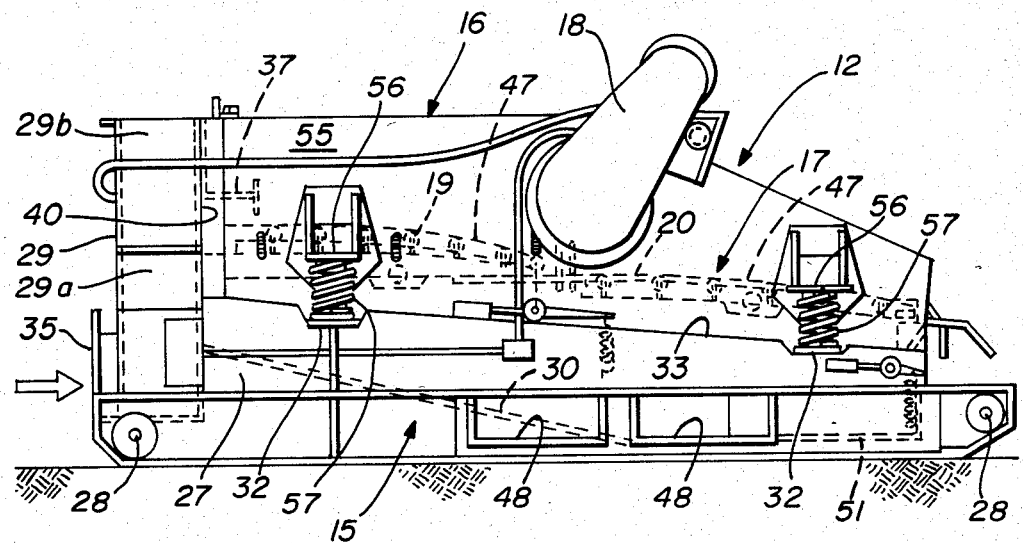
FIG. 1 is a schematic side elevational view of a vibrating screen device incorporating the present invention.

Referring now to the drawing, there is illustrated a vibrating screen device incorporating the present invention. In referring to the various figures of the drawing, like numerals shall refer to like parts. The vibrating screen device disclosed herein is of the type described in prior U.S. Pat. No. 3,666,095 issued May 30, 1972 in the names of Robert A. Kryrock and Robert W. Ruhe, Jr. Reference may be had to this patent for a more detailed description of the vibrating screen device described herein.

Figure 2:
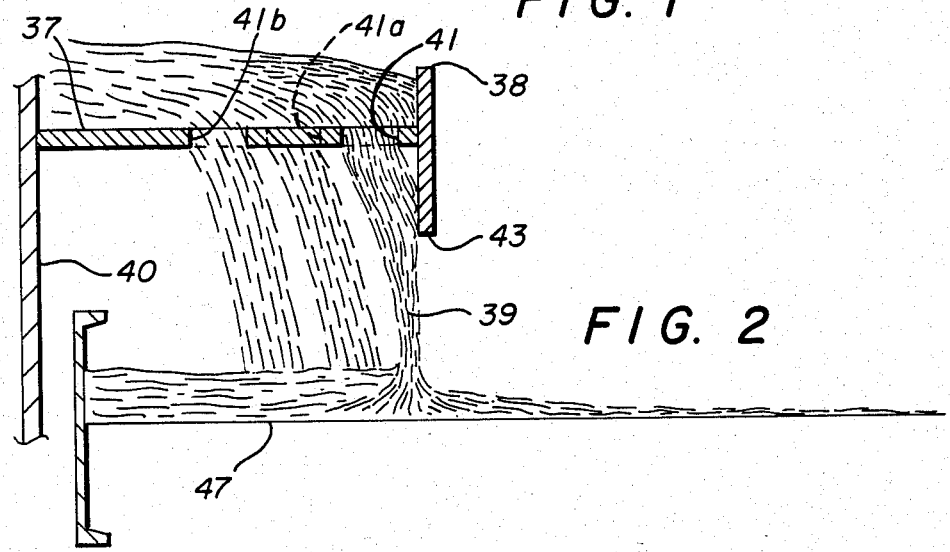
FIG. 2 is an enlarged fragmentary side view illustrating a specific detail of the present invention.

In the embodiment of the invention particularly shown in FIGS. 1 and 2, vibrating screen device 12 is used for the fine screening of oil well drilling mud and similar slurries. Screen 12 is a portable, self contained unit, having a combined tank and base 15, screen box 16, screen deck 17, and vibrator and drive assembly 18. Combined tank and base is essentially "L" shaped in its side elevation, as shown in FIG. 1. Screen 12 is substantially rectangular in its top plan view. Deck 17 is made up of two sections, feed end section 19 and discharge end section 20. Screen box 16 is spring supported on base 15 and carries screen deck 17 and a vibrator and drive assembly 18. As illustrated in U.S. Pat. No. 3,666,095, drive and vibrator assembly 18 comprises a "V" belt connecting a first pulley to one end of a vibrator shaft and a second pulley attached to an electric motor mounted on the top of box 16. An unbalanced weight is carried on the vibrator shaft.

The tank and base 15 is composed of two vertical side plates 27, two transverse tubes 28, feed box 29, and collecting tank 30. Each side plate 27 is a reinforced weldment having suitable horizontal stiffners and reinforced spring support brackets 32 attached thereto. Upper edge 33 of the side plates is sloped downwardly from the feed end to the discharge to conform generally to the average slope of screen deck 17. Tubes 28 act as transverse structural ties between side plates 27 at each end of the base near the bottom of the side plates.

At the feed end of the screen, feed box 29 is attached to side plates 27 just above one of the transverse tubes 28 and comprises lower portion 29a and upper portion 29b. The lower portion is triangular in transverse cross-section and is arranged to receive material from inlet pipe 35 and direct same upwardly to the generally rectangular portion 29b which communicates with a generally horizontally disposed weir plate 37 to be more fully described hereinafter. Weir plate 37 is secured to vertical wall 40 of feed box 29.

Collecting tank 30 is integrally formed in base 15 to provide a water-tight hopper for collecting undersized material and water flowing through screen 47 supported on screen deck 17. Preferably, screen 47 comprises at least two overlying layers of mesh screen cloth. Discharge openings 48 are provided in the lower central portion of each side plate 27 for withdrawing the undersized material. A formed bottom plate 51, sloping from the feed end to discharge openings 48 and flanged vertically at the discharge end, is welded to side plates 27 to provide for the collection of the undersized materials and water and to permit it to flow to discharge openings 48.

Screen box 16 comprises essentially two vertical side plates 55. Spring support brackets 56 are welded to each side plates at predetermined locations. Coil springs 57 are located between screen box brackets 56 and base brackets 32 to provide for isolation of vibrating screen box 16 from base 15. Screen deck 17 is bolted to side plates 55 to tie them together transversely into a rigid structure.

Screen deck 17 comprises generally horizontal feed section 19 followed by discharge section 20 downwardly inclined 5° in the direction of flow. Screen box 16, with screen deck 17, drive and vibrator assembly 18, and screen means 47 all move as a unite with a vibrating motion produced by the vibrator assembly.

Referring now specifically to FIG. 2, there is shown an enlarged side view of a portion of the vibrator screen device hereinabove described, specifically illustrating features of the present invention. As noted previously, upper portion 29b of feed box 29 defines a flow opening for discharging the fluid and entrained particles onto a horizontally extending plate 37. Plate 37 is connected to vertical wall 40 of the feed box. Plate 37 functions as a weir to direct the flow of fluid onto screen 47. In particular, weir plate 37 overlies an up-stream portion of the screen. A generally vertically extending plate 38 is attached to the downstream end of weir plate 37. Plate 38 functions as a dam to collect a pool of fluid on the top surface of the weir plate. The weir plate includes at least one fluid flow opening 41 positioned substantially adjacent dam plate 38. As illustrated in FIG. 2, weir plate 37 preferably includes a plurality of fluid flow openings 41a and 41b, each of the additional fluid flow openings being located upstream with respect to the one fluid flow opening 41. The fluid flow openings provided through the weir plate, enables the fluid collected on the upper surface of the dam to flow downwardly onto the underlying portion of screen 47.

Flow directing plate 43 is connected to the underside of weir plate 37 and functions to direct the fluid flowing through fluid flow opening 41 towards the upstream portion of the underlying screen. Plate 43 is generally vertically disposed with respect to plate 37 and is in general vertical alignment with dam plate 38. In the preferred embodiment, plate 43 is an integral extension of plate 38.

Heretofore, it has been observed that, in the absence of the dam and flow directing plates attached to the weir, a substantial portion of the fluid falls from the weir downstream of the feed end or upstream portion of the screen underlying the weir. Essentially, this upstream portion of the screen is under utilized, thereby reducing the overall capacity of the screen.

In operating a vibratory screen of the type disclosed herein including the present invention, fluid delivered from feed box 29 flows onto weir 37. Dam plate 38 attached thereto causes a body of fluid to collect on the upper surface of the weir plate. The fluid falls towards the underlying upstream portion of the screen through fluid flow openings 41, 41a, 41b formed in the weir plate. Flow directing plate 43 insures that the fluid flowing through opening 41 adjacent thereto, generally falls in a generally vertical direction towards the screen.

As clearly shown in FIG. 2, the flow of fluid through opening 41 strikes the flow directing plate and thereafter falls in a generally vertical direction directly towards the underlying screen to form a fluid flow curtain 39. The fluid passing through the remaining fluid flow openings 41a and 41b upstream of opening 41 falls onto the underlying screen upstream of fluid flow curtain 39. Fluid flow curtain 39 functions to restrict the free flow of fluid from the upstream portion of the screen to the downstream portion thereby increasing the depth of fluid on the screen upstream of fluid flow curtain 39. By increasing the depth of the fluid on the upstream portion of the screen, the retention time of the fluid on the screen upstream of the curtain is subsequently increased. By increasing the period of time in which the fluid is retained on the screen, operation of the vibratory screen on the retained fluid will have a maximum impact. Thus, a more complete separation of the solid matter from the fluid will be obtained. The combination of the dam and the fluid flow directing plate, not only directs the fluid passing from the weir onto the underlying upstream portion of the screen to insure that the total surface area of the screen is utilized, but in addition, by forming the fluid flow curtain, the overall screening effect of the screen device is enhanced.

Figure 3:
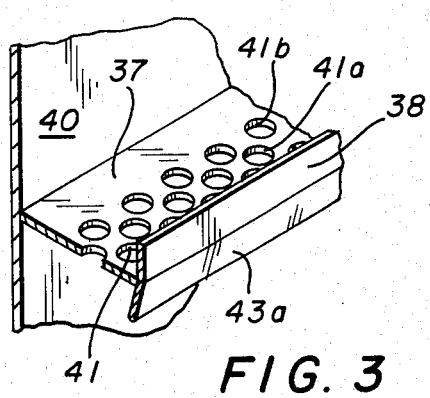
FIG. 3 is a perspective view illustrating a second embodiment of the present invention.

With reference to FIG. 3, a second embodiment of the invention is disclosed. In particular, flow directing plate 43a is canted somewhat towards vertical wall 40 of feed box 29. It has been found that the fluid discharged from the weir plate has both vertical and horizontal velocity components. By canting the plate towards feed box 29, the horizontal velocity component of the fluid is negated, and in actuality, the fluid may fall in a direction slightly angled towards the upstream portion of the screen.

When the angled fluid curtain strikes the underlying screen, the fluid will undergo a directional change so that the fluid is flowing towards the discharge end of the screen, rather than towards the upstream end as directed by canted plate 43a. By causing the fluid to undergo a change in direction on the screen's surface, the retention time of the fluid will be increased to further enhance separation of particles from the fluid.

Figure 4:
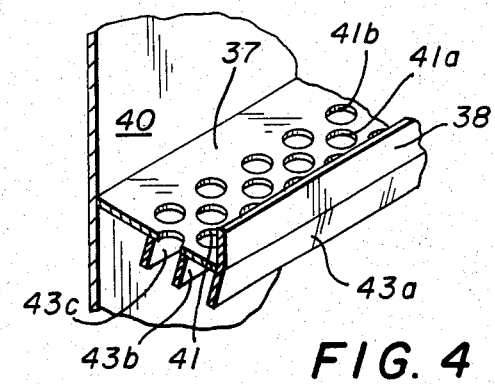
FIG. 4 is a perspective view illustrating a third embodiment of the present invention.

Referring now to FIG. 4, a third embodiment of the invention is shown. Additional plates 43b and 43c are connected to the bottom surface of weir plate 37. Additional plates 43b and 43c are located slightly downstream of additional fluid flow openings 41a and 41b formed in plate 37. Like plate 43a illustrated in FIG. 3, plates 43a, 43b and 43c, are slightly canted towards feed box 29 to direct all of the fluid passing through the fluid flow openings in a slightly upstream or backwards direction.

The present invention increases the operating life of the screen by insuring that the fluid falling onto the surface of the screen is distributed over a rather large area rather than a confined or limited area. Further, the use of the dam means and flow directing means, in combination, insures that the underlying upstream portion of the screen is totally utilized and that the fluid falling thereon is retained for a prolonged period of time through the development of the fluid curtain.

While a preferred embodiment of the present invention has been described and illustrated, the invention should not be limited thereto but may be otherwise embodied within the scope of the following claims.

The embodiments of the invention in which an exclusive property or privilege is claimed are defined as follows:

1. A vibrating screen machine for separating particles from fluid in which a fine mesh screen is located within a vibratory basket, and means is provided for vibrating the basket, said machine further including:
   supply means for delivering fluid having the entrained particles from a source thereof towards said screen;
   weir means disposed substantially adjacent the supply means and overlying an upstream portion of said screen for directing the flow of fluid onto said screen, said weir means including an upstream end positioned directly adjacent said supply means and a downstream end positioned away therefrom;
   dam means attached to the downstream end of said weir means for forming a pool of said fluid on said weir means, said weir means including at least one fluid flow opening positioned substantially adjacent said dam means; and
   flow directing means connected to said weir means for directing the fluid flowing through said fluid flow opening towards the upsteam portion of said screen underlying said weir means.

2. A vibratory screening machine in accordance with claim 1 wherein said dam means comprises a generally vertically extending member attached to the downstream end of the weir means.

3. A vibratory screening machine in accordance with claim 2 wherein said flow directing means comprises a generally vertically extending plate positioned below and in generally vertical alignment with said vertically extending member and attached to the downsteam end of the weir means.

4. A vibratory screening machine in accordance with claims 1 or 2 wherein said weir means comprises a horizontally extending plate having the upstream end attached to said fluid supply means.

5. A vibratory screening machine in accordance with claims 1 or 3 wherein a fluid curtain is formed as a consequence of said fluid being directed by said fluid directing means, said fluid curtain extending substantially vertically downwards from said weir means towards said screen and in general vertical alignment with said flow directing means; and said weir means includes a plurality of fluid flow openings spaced from the downstream end towards the upstream end of said weir means, the fluid falling onto said screen through said upstream openings being restricted from flowing freely towards the downstream end of said screen by said fluid curtain to increase the fluid depth on said screen upstream of said curtain to thereby increase the retention time of said fluid on said upstream portion of said screen.

6. A vibratory screening machine for separating particles from fluid in which a fine mesh screen is located within a vibratory basket, and means is provided for vibrating the basket, said screening machine further including;
   supply means for delivering fluid having entrained particles from a source thereof towards said screen;
   a horizontally extending plate having an upstream end secured to the supply means for directing flow of the fluid delivered from said supply means, said plate having a plurality of horizontally spaced fluid flow openings provided therethrough for directing flow of fluid onto the upstream portion of the screen;
   an upstanding member secured to the downstream end of the horizontal plate and defining a dam for forming a pool of fluid on said horizontal plate, at least one of the fluid flow openings in said plate being disposed adjacent said upstanding member; and
   a first downwardly extending member generally vertically aligned with said upstanding member and secured to the downstream end of the horizontal plate for directing fluid flowing through said one flow opening towards the upstream portion of said screen underlying said horizontally extending plate.

7. A vibratory screening machine in accordance with claim 6 wherein said downwardly extending member is slightly canted towards said supply means.

8. A vibratory screening machine in accordance with claims 6 or 7 wherein there are additional downwardly extending members secured to the bottom surface of said horizontal plate and spaced from and disposed parallel to said first downwardly extending member.

9. A vibratory screening machine in accordance with claims 6 or 7 wherein a fluid curtain is formed as a consequence of said fluid being directed by said downwardly extending member, said fluid curtain extending substantially vertically downwards from said horizontal plate towards said screen and in general vertical alignment with said first downwardly extending member; and said horizontal plate includes a plurality of fluid flow openings spaced from the downstream end towards the upstream end of said horizontal plate, the fluid flowing onto said screen through said upstream openings being restricted from flowing freely towards the downstream end of said screen by said fluid curtain to increase the fluid depth on said screen upstream of said curtain to thereby increase the retention time of said fluid on said upstream portion of said screen.

* * * * *